United States Patent
Seyfi et al.

(10) Patent No.: US 11,729,372 B2
(45) Date of Patent: Aug. 15, 2023

(54) DRONE-ASSISTED SENSOR MAPPING

(71) Applicant: Alarm.com Incorporated, Tysons, VA (US)

(72) Inventors: Ahmad Seyfi, Tysons, VA (US); Donald Gerard Madden, Columbia, MD (US); Glenn Tournier, Tysons, VA (US); Babak Rezvani, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/077,017

(22) Filed: Oct. 22, 2020

(65) Prior Publication Data

US 2021/0125369 A1    Apr. 29, 2021

Related U.S. Application Data

(60) Provisional application No. 62/924,847, filed on Oct. 23, 2019.

(51) Int. Cl.
*H04N 17/00* (2006.01)
*G06T 7/73* (2017.01)
(Continued)

(52) U.S. Cl.
CPC ......... *H04N 17/002* (2013.01); *B64C 39/024* (2013.01); *B64D 47/08* (2013.01); *G06T 7/246* (2017.01); *G06T 7/73* (2017.01); *G06V 20/13* (2022.01); *G06V 20/17* (2022.01); *G06V 20/52* (2022.01); *G06V 40/10* (2022.01); *G06V 40/20* (2022.01); *H04N 23/90* (2023.01); *B64U 10/13* (2023.01); *B64U 2101/30* (2023.01); *G06T 2207/30232* (2013.01); *G06T 2207/30244* (2013.01)

(58) Field of Classification Search
CPC . G06T 7/73; G06T 7/246; G06T 2207/30232; G06T 2207/30244; G06K 9/00771; G06K 9/00335; G06K 9/0063; G06K 9/00362; B64C 39/024; B64C 2201/127; B64C 2201/027; B64D 47/08; H04N 5/247; H04N 7/185; H04N 17/002; G08B 13/196
See application file for complete search history.

(56) References Cited

U.S. PATENT DOCUMENTS 10,594,983 B2    3/2020   Dannan et al.
10,867,398 B2    12/2020  Leduc
(Continued)

*Primary Examiner* — Nasim N Nirjhar
(74) *Attorney, Agent, or Firm* — Fish & Richardson P.C.

(57) ABSTRACT

Methods, systems, and apparatus for drone-assisted sensor mapping are disclosed. A method includes detecting a sensor in a detection area of a drone; based on detecting the sensor in the detection area of the drone, detecting the drone in sensor data captured by the sensor; determining a detection area of the sensor based on movement of the drone after the drone is detected; and determining a destination for the drone based on the detection area of the sensor. The method may include mapping boundaries of the detection area of the sensor to a map of an area where the sensor is located. The sensor can be a passive infrared sensor, an active infrared sensor, a radar sensor, a sonar sensor, a time of flight sensor, a structured light sensor, or a lidar sensor.

20 Claims, 4 Drawing Sheets

(51) Int. Cl.
  *G06T 7/246*    (2017.01)
  *B64C 39/02*    (2023.01)
  *B64D 47/08*    (2006.01)
  *G06V 20/13*    (2022.01)
  *G06V 20/52*    (2022.01)
  *G06V 40/10*    (2022.01)
  *G06V 40/20*    (2022.01)
  *H04N 23/90*    (2023.01)
  *G06V 20/17*    (2022.01)
  *B64U 10/13*    (2023.01)
  *B64U 101/30*   (2023.01)

(56) References Cited

U.S. PATENT DOCUMENTS

| | | | |
|---|---|---|---|
| 2017/0234966 A1* | 8/2017 | Naguib | G01S 5/22 |
| | | | 367/117 |
| 2017/0261999 A1* | 9/2017 | Van Voorst | G08G 5/0082 |
| 2018/0150994 A1* | 5/2018 | Foutzitzis | G08B 13/19628 |
| 2018/0157255 A1 | 6/2018 | Halverson et al. | |
| 2018/0284773 A1* | 10/2018 | Pratt | G05D 1/005 |
| 2018/0357909 A1* | 12/2018 | Eyhorn | G08G 5/0013 |
| 2020/0369385 A1* | 11/2020 | Thörn | G08G 5/0069 |
| 2021/0025975 A1* | 1/2021 | Seeber | G01S 13/86 |
| 2021/0048829 A1* | 2/2021 | Deyle | G05D 1/0246 |

* cited by examiner

DRONE-ASSISTED SENSOR MAPPING

CROSS-REFERENCE TO RELATED APPLICATION

This application claims the benefit of the U.S. Provisional Patent Application No. 62/924,847 filed Oct. 23, 2019, which is incorporated herein by reference in its entirety.

TECHNICAL FIELD

This disclosure application relates generally to monitoring systems.

BACKGROUND

Many properties are equipped with property monitoring systems that include sensors and connected system components. Property monitoring systems can receive and analyze data from sensors that are internal and external to the property. Sensors can be fixed or can be mobile. Mobile sensors can be mounted on robotic devices such as drones.

SUMMARY

Techniques are described for drone-assisted sensor mapping.

A drone including one or more sensors can navigate a property and generate a model, e.g., a three-dimensional (3D) map, of the property. The drone can locate and identify sensors, e.g., cameras, positioned throughout the property. The drone can identify detection areas, or fields of view, of the various sensors at the property. The drone can overlay the fields of view of the various sensors at the property onto the 3D map of the property. The drone can adapt its mission routes to account for the coverage of other sensors in the property. For example, the drone can tailor its mission routes to cover holes in the field of view of the other sensors.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
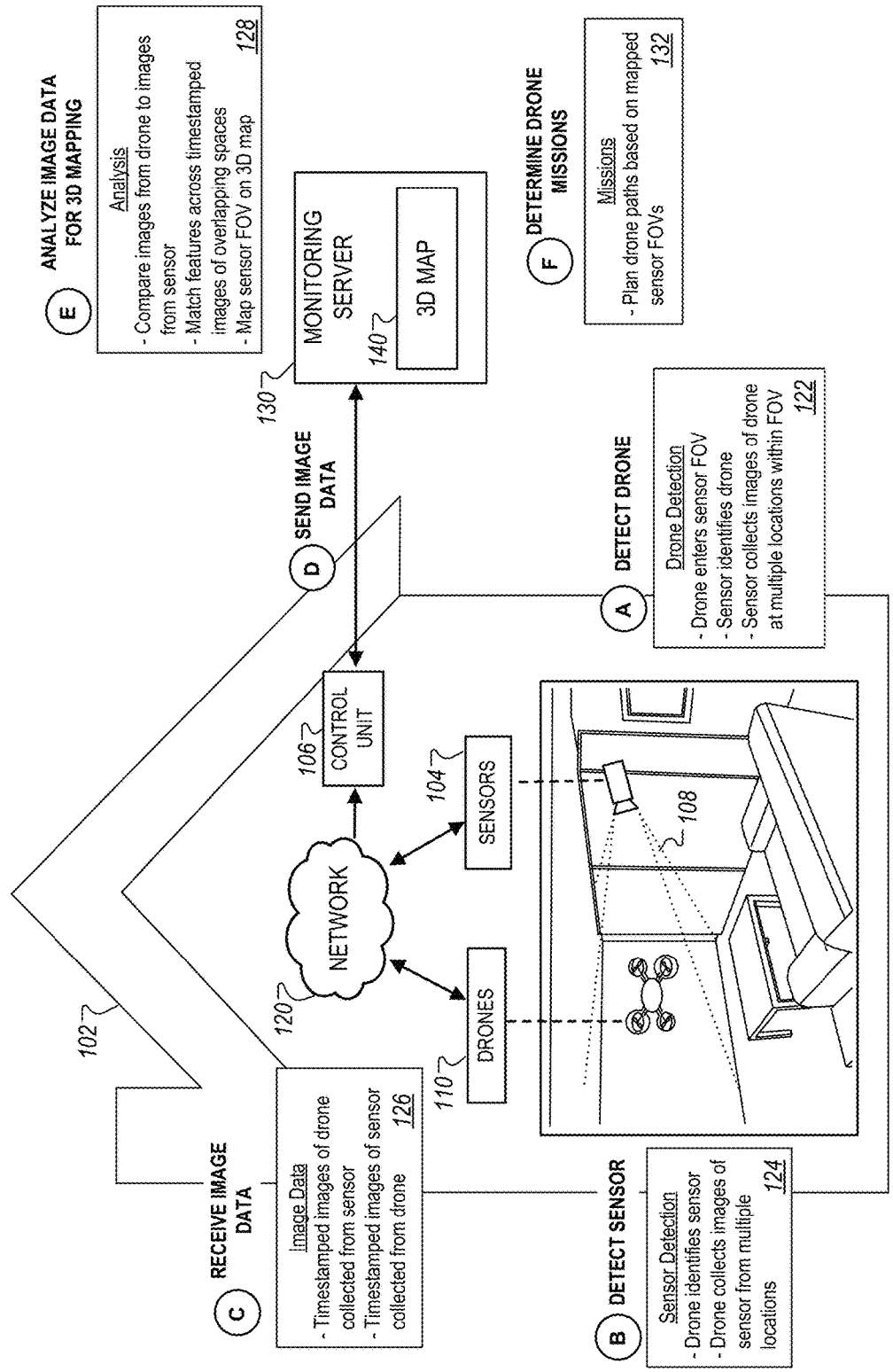
FIG. 1 is a diagram illustrating an example system for drone-assisted sensor mapping.

FIG. 1 is a diagram illustrating an example system 100 for drone-assisted sensor mapping. A property 102 is monitored by a monitoring system. The property 102 can be a home, another residence, a place of business, a public space, or another facility that is monitored by a monitoring system.

The system 100 includes one or more robotic devices, e.g., drones 110. The drones 110 may be any type of automated device that is capable of moving and taking actions that assist in property monitoring. For example, the drones 110 may be capable of moving throughout the property 102 based on automated control technology and/or user input control provided by a user. The drones 110 may be able to fly, roll, walk, or otherwise move about the property 102. In the example shown in FIG. 1, the drone 110 is an aerial drone.

In some examples, the drones 110 automatically navigate within the property 102. The drones 110 can include sensors and control processors that guide movement of the drones 110 within the property 102. The control processors can process output from the various sensors and control the drones 110 to move along a path that reaches a desired destination and avoids obstacles.

In some examples, the drones 110 may include data capture and recording devices. For example, the drones 110 may include one or more cameras, one or more motion sensors, and/or one or more microphones. In the example shown in FIG. 1, the drone 110 includes an attached camera.

In addition, the drones 110 may store data that describes attributes of the property 102. For instance, the drones 110 may store a floorplan and/or a 3D map 140 of the property 102 that enables the drones 110 to navigate the property 102. In some examples, the 3D map 140 may be stored remotely, e.g., on a control unit 106 and/or a monitoring server 130 of the monitoring system, and the drones 110 can access the 3D map 140 by communication, e.g., through a network 120.

The network 120 can be any communication infrastructure that supports the electronic exchange of data between components of the monitoring system. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies.

The drones 110 may include a communication module that enables the drones 110 to communicate with the control unit 106, the monitoring server 130, each other, and/or other devices. The communication module may be a wireless communication module that allows the drones 110 to communicate wirelessly. In some implementations, the drones 110 survey the property 102 and transmit various types of parameters (or parameter values), sensor/drone data, and status information to the monitoring server 130 to generate or update the 3D map 140.

The system 100 can include multiple sensors 104. An example sensor 104 can be a video or image recording device located at the property 102, such as a digital camera or other electronic recording device. The sensors 104 located at the property 102 collect sensor data related to the property 102. Example sensors 104 can include cameras, motion sensors, and microphones. In the example shown in FIG. 1, the sensor 104 is a video camera.

The drones 110 and the sensors 104 can transmit data to the control unit 106 via the network 120. Example data can include indoor and outdoor motion sensor data, timestamped images and video analysis from cameras, and microphone audio data. The control unit 106 can collect and assess the data from the drones 110 and the sensors 104 to monitor conditions of the property 102.

The control unit 106 can be, for example, a computer system or other electronic device configured to communicate with the drones 110 and the sensors 104. The control unit 106 can also perform various management tasks and functions for the monitoring system. In some implementations, a resident, a visitor, or another user can communicate with the control unit 106 (e.g., input data, view settings, or adjust parameters) through a physical connection, such as a touch screen or keypad, through a voice interface, or over a network connection.

The monitoring server 130 can be, for example, one or more computer systems, server systems, or other computing devices that are located remotely from the property 102 and that are configured to process information related to the monitoring system at the property 102. In some implementations, the monitoring server 130 is a cloud computing platform.

As a robot, e.g., a drone 110, traverses an environment such as the property 102, the drone 110 can build a 3D map 140 of the environment using techniques such as Simultaneous Location and Mapping (SLAM) based on observations. The 3D map 140 can then be used to navigate and track changes in the environment. The drone 110 can also localize to the 3D map 140 using SLAM or other localization techniques.

In some examples, other sensors 104, such as video cameras, may be active in the environment. Mapping fields of view (FOVs) 108 of the sensors 104 to the 3D map 140 can benefit the overall security and automation system. For example, mapping the fields of view 108 of the sensors 104 to the 3D map 140 can provide context and calibration to the sensors 104, allowing richer and more accurate interpretation and display of sensor data. In some examples, mapping the fields of view 108 of the sensors 104 to the 3D map 140 can improve understanding of when objects might be occluded by obstacles in a 3D scene. Mapping the fields of view 108 can also improve interpretations of the scale of detected objects, and improve 3D displays of detected objects. Mapping the fields of view 108 can also assist with real-time relocalization of the drone 110.

Mapping fields of view 108 of the sensors 104 to the 3D map 140 can provide topological or functional context. For example, a monitoring system may be able to place a camera in a context, e.g., the camera is inside a front door or in a hallway leading to bedrooms. This can allow the system to better understand sensor 104 blind spots and navigational choke points in the property 102 and to deploy the drone 110 strategically to supplement the existing sensors 104. The system may also be able to recommend additional fixed sensors 104.

Mapping fields of view generally entails analyzing a feed from a given sensor 104, e.g., a fixed video camera, by fusing imagery and telemetry data collected by the drone 110 and/or the generated 3D map 140 with timestamped data (video) from the sensors 104. Imagery and telemetry data can be fused with timestamped data from the sensors 104 in one of several ways.

The drone 110 is configured to register itself to the 3D map 140 using SLAM techniques as well as other known localization methods. In response to its self-registration, the drone 110 can then determine an estimate of a relative transformation between the drone 110 and a sensor 104 via localization and mapping methods. The drone 130 is operable to then use this transformation to determine an estimated location or position of the sensor 104 and register that estimated location or position of the sensor 120 to the 3D map 140.

In some examples, camera images, e.g., video, can be fused with the position of the drone 110. The drone 110 can fly into the field of view 108 of the camera, either intentionally or by happenstance. As the camera captures video of the drone 110, movement of the drone 110 within the camera's field of view 108 is detected by the system. The system can determine that the movement within the field of view 108 corresponds to the drone 110 using one or more correlation techniques.

To identify and locate sensors 104 at the property 102, the drone 110 can receive a list of devices or sensors from a component of system 100. For example, the drone 110 can receive the list of sensors 104 from the monitoring server 130 via a secure or authenticated network connection. In some implementations, receiving the list of sensors 104 can include receiving information such as sensor type, sensor model, sensor capabilities, sensor status, or other information pertaining to various attributes of each sensor 104. The drone 110 can receive the list of sensors 104 before starting a discovery process to identify and locate the sensors 104, during the discovery process, or both.

Each of the drone 110 and sensors 104 are operable to receive commands and other signals from the monitoring server 130. In some implementations, the command is a data payload that includes instructions and data values for commanding the drone 110 or sensors 104 to perform one or more specific functions at the property 102. For example, a command can cause the drone 110 to travel to a particular sensor 104 or area of the property 102 and/or to transmit of mapping data from the drone 110 to generate the 3D map 140.

In some examples, correlation between movement in the video and the drone 110 can be confirmed by visual recognition of the drone 110 using a deep neural network or pattern recognition. In some examples, correlation between movement in the video and the drone 110 can be confirmed by reading a coded pattern on the drone 110. In some examples, correlation can be confirmed by an active process such as blinking of LEDs or movement by the drone 110 according to a pattern specified by the system. Blinking of LEDs and pattern movement by the drone 110 might change over time to avoid spoofing. Given a match, at least one correspondence between the drone 110's pose and the field of view 108 can be confirmed. The 3D location the drone 110 occupies, given by the drone's own odometry and localization calculations, corresponds to a location in the sensor's image plane within the frame.

If there are multiple distinct points or features on the drone 110 which the system can identify from the image, and the system knows the position of the points or features relative to each other on the drone 110, the points or features can be treated as additional correspondence points. Flying to a new location provides additional correspondence points. When there are enough points (which will vary depending on the number of assumptions made about the camera intrinsic parameters and the overall accuracy of the drone's localization, imaging, etc.), the system can solve for parameters of a camera projection model and then project the camera's field of view 108 in 3D onto the 3D map 140. Coordination of drone-based positioning with camera position can be further used to validate vision-based rules such as blackout regions or tripwires for recording events.

In some examples, camera images can be fused with drone 110 images. Images from the fixed sensor 104 may be treated as images from the drone 110 if localizing to the 3D map 140 using SLAM or similar techniques. One difference is that there may be no position estimate for the sensor, so a search may be widened to the entire 3D map 140 to find features. Images are captured from the fixed sensor 104 over time. To increase accuracy, images may be rejected when there are objects moving in the video, when there are large changes in pixel values due to lighting changes, etc. These images may be rejected so that the imagery captures as much of the baseline environment as possible. Each image is analyzed with a feature detector, and the descriptors of each feature are computed and used for localization against the 3D map 140.

In order to increase the likelihood of matching features across images of overlapping spaces, the system can attempt to compare images from approximately the same timeframe in order to minimize lighting or scene changes such as a moved chair. Samples incorporated into the SLAM map from the drone 110 can be timestamped, and the system can attempt to compare the samples to imagery from the fixed sensor 104 near that timestamp.

If mapping is performed while the drone 110 is operating, the drone 110 can move close to the fixed sensor 104 and approximate a similar pose with the drone 110's own camera, in order to minimize matching errors. In this case, the latest frame from the fixed sensor 104 before the drone 110 flies into the field of view 108 could be used to match to live updates from the drone's attached camera.

In some examples, sensor 104 position can be inferred from drone 110 images. Given enough distinguishing features on the sensor 104 itself, the system can detect the sensor 104 in the drone's video feed. The drone 110 can estimate a localized pose within the 3D map 140 using SLAM or other localization techniques. Using the localized pose of the drone 110 within the 3D map 140, the system can determine the location of the sensor 104 within the 3D map 140. The system can determine the location of the sensor 104 by projecting the location of the sensor 104 within the images captured from the drone 110 from a given pose onto the surfaces of the 3D map 140. The drone 110 can maneuver to a different pose, and the mapping process can repeat. Each image from a different pose of the drone 110 can improve the accuracy of location via triangulation.

In order to determine the field of view 108, the system needs to know the intrinsics of the camera. The system also needs enough resolution to be able to recognize, in some instances, three or more distinguishing features on the camera in order to estimate extrinsic parameters, e.g., a six degree-of-freedom pose, accurately. A small tag or logo somewhere on a camera housing can be used to provide the features. In some examples, features such as screws, the camera lens, etc. may suffice. The drone 110 likely needs to get very close to the sensor 104 and obtain imagery from several poses in order to accurately detect and triangulate these features. The system can then estimate the full six degree-of-freedom pose of the sensor 104. Using a tag method can also allow the drone 110 or the system to identify which sensor 104 the drone 110 is looking at. Other methods can be used, such as a low-power radio identification (e.g., a z-wave handshake) or one of the methods described above.

These methods for fusing imagery and telemetry data with timestamped data from the sensors 104 may be used in combination to improve accuracy, or cascaded. For example, the system can discover the sensor 104 from the drone 110 by fusing sensor 104 position with drone 110 images. The system can then request the imagery from the sensor 104 and use the estimated position to bootstrap the localization to the 3D map 140 by fusing the sensor 104 images with drone 110 images. The system can then verify the results by again fusing sensor 104 position with drone 110 images.

In the case of a pan-tilt-zoom (PTZ) or varifocal sensor, the sensor 104 can be taken through the extent of its travel while the drone 110 interacts with the field of view 108. If sufficient instrumentation exists on the camera that the camera can readout a reasonably precise indication of its pose or focal length, the system can calculate the field of view 108 at current settings and infer the field of view 108 at other settings.

Field of view 108 mapping can be performed in real time, while the 3D map 140 is being constructed and/or refined, or post-mission, once the 3D map 140 is complete. In the former case, the fields of view 108 can be linked to features in the 3D map 140. Should portions of the 3D map 140 need to be adjusted during refinement, the position of the fields of view 108 can be adjusted with the features.

In some examples, field of view 108 mapping can be performed passively, as the drone 110 happens to move through various fields of view 108 during a mapping process or during normal operation. In some examples, field of view 108 mapping can be considered an active goal of the drone 110's mission. The drone 110 can purposefully attempt to discover the fields of view 108 of any unmapped sensors 104, and once discovered, move within the field of view 108 in order to discover the field of view 108 correspondence to the 3D map 140.

The correspondence of the field of view 108 to the 3D map 140 can be used to calculate the camera's intrinsic and extrinsic parameters. If any of these parameters are already known, the parameters can be used to verify the field of view 108 or to speed the measurement and calculation of the field of view 108. For example, if the intrinsics of a camera are known, the system may only need one sighting of the drone 110, containing multiple features on the drone 110, to calculate the full pose of the camera.

Synchronization of timestamps between the sensor 104 and the drone 110 may be important, both in some of the techniques described above, and for general coordination of data within the system. If the drone 110 is known to be within the field of view 108 of a camera, the drone 110 can use an agreed-upon pattern of movements or blinking lights to communicate a synchronization signal or time code to the camera. The system can use the synchronization information to synchronize timestamps. Given accurate clock synchronization by other means, the system can establish the glass-to-processing latency of the sensor 104 in question.

Advantages of mapping the fields of view 108 can include the following. Given that one purpose of the drone 110 is to perform surveillance and reconnaissance within the property 102, knowing positions of other sensors 104 used for the same purpose is valuable. Drone missions 132 can be optimized to focus on areas where the fixed sensors 104 cannot cover, or conversely, to provide a second set of eyes when a fixed sensor 104 is detecting something. The drone 110 can use the 3D map 140 (or a derivative) to plan the drone's own path around the property 102. The drone 110 can also use the 3D map 140 to track a possible path of a person who is detected by a sensor 104 and to estimate the person's current location when the person is no longer visible to the sensor 104.

Once the pose of the fixed sensor 104 is determined, the system can use related techniques to relocalize a lost drone 110. Any of the main fusion approaches described above can provide the pose of the sensor 104 relative to the drone 110. When the system is confident in the absolute pose of the drone 110 relative to the 3D map 140, the system can use the relative pose as a transform to determine the absolute position of the sensor 104 relative to the 3D map 140. The system can also reverse this process. When the system knows the absolute position of a fixed sensor 104 and determines the relative pose of a lost drone 110 to the fixed sensor 104, the system can then compute the absolute pose of the drone 110 and relay this information to the drone 110 in order to relocalize the drone 110. The system may choose to route the drone 110 through areas where another sensor 104 is present if there is risk of high drift and becoming lost. Risk of high drift can perhaps be due to an interior that makes it hard for the drone 110 to find features to use for odometry or to localize to using SLAM or similar techniques.

FIG. 1 illustrates a flow of data, shown as stages (A) to (F), which can represent steps in an example process. Stages (A) to (F) may occur in the illustrated sequence, or in a sequence that is different from the illustrated sequence. For example, some of the stages may occur concurrently. The example illustrated in FIG. 1 includes one sensor 104 and one drone 110. However, some examples can include additional sensors 104 and/or drones 110. The sensor 104 in this example is a video camera. The drone 110 in this example is an aerial drone with an attached camera.

In stage (A) of FIG. 1, a sensor 104 detects 122 a drone 110. For example, the drone 110 may enter within the field of view 108 of the sensor 104. The sensor 104 can identify the drone 110 using one or more of the identification methods described above. The sensor 104 can collect images of the drone 110 at multiple locations within the field of view 108. The images of the drone 110 can be generated from any appropriate type of light. For example, the images can be generated from any combination of visible light, IR light, or UV light. The images can also be generated from RADAR, LIDAR, and/or microwave imaging.

In stage (B) of FIG. 1, the drone 110 detects 124 the sensor 104. For example, the drone 110 may enter within a range of the sensor 104 such that the sensor 104 is in a field of view of the attached camera on the drone 110. The drone 110 can identify the sensor 104 using one or more of the identification methods described above. The drone 110 can collect images of the sensor 104 from multiple locations. The images of the sensor 104 can be generated from any appropriate type of light. For example, the images can be generated from any combination of visible light, IR light, or UV light. The images can also be generated from RADAR, LIDAR, and/or microwave imaging.

In some cases, the drone 110 can identify and/or recognize the sensor 104. For example, the drone 110 can be programmed to recognize various types and models of sensors. The drone 110 can recognize the sensor 104 based on, for example, observing a recognizable symbol or pattern of the sensor. Once the drone 110 recognizes the sensor 104, the drone 110 may be able to access stored characteristics of the sensor. For example, the drone 110 may be able to access intrinsic characteristics such as an angular field of view, a range, a pulse rate, etc.

The drone 110 may also be able to determine, based on observation, extrinsic characteristics of the sensor, e.g. a location, elevation, and/or orientation of the sensor. Based on the stored intrinsic characteristics of the sensor, the observed extrinsic characteristics of the sensor, or both, the drone 110 can estimate the detection area of the sensor. For example, the drone 110 may be able to estimate a vertical field of view of the sensor, a horizontal field of view of the sensor, and a range of the sensor.

In some examples, the drone 110 can use the estimated detection area of the sensor as a preliminary detection area. The drone 110 can then maneuver around the estimated detection area in order to verify and/or update the detection area. In this way, the drone 110 can start with a preliminary map of a detection area, and can fine-tune the map of the detection area by maneuvering in and out of the estimated detection area.

Stages (A) and (B) of FIG. 1 may be independent from one another and can occur at the same time or at different times. In some examples, the drone 110 detects 124 the sensor 104 and the sensor 104 detects 122 the drone 110. In some examples, only the drone 110 detects 124 the sensor 104. In some examples, only the sensor 104 detects 122 the drone 110.

In stage (C) of FIG. 1, the control unit 106 receives image data 126. The image data 126 can include timestamped images from the drone 110 and timestamped images from the sensor 104. The image data 126 can include images collected at or near the same time and/or images collected at different times. The control unit 106 can receive the image data 126 over the network 120.

In stage (D) of FIG. 1, the control unit 106 sends the image data 126 to the monitoring server 130. The control unit 106 can send the image data 126 to the monitoring server 130 over a long-range data link. The long-range data link can include any combination of wired and wireless data networks. For example, the control unit 106 can exchange information with the monitoring server 130 through a wide-area-network (WAN), a broadband interne connection, a cellular telephony network, a wireless data network, a cable connection, a digital subscriber line (DSL), a satellite connection, or other electronic means for data transmission. In some implementations, the long-range data link between the control unit 106 and the monitoring server 130 is a secure data link (e.g., a virtual private network) such that the data exchanged between the control unit 106 and the monitoring server 130 is encoded to protect against interception by an adverse third party.

In stage (E) of FIG. 1, the monitoring server 130 analyzes 128 the image data 126 for 3D mapping. The monitoring server 130 can compare images from the drone 110 to images from the sensor 104 and can match features across timestamped images of overlapping spaces. The monitoring server 130 can estimate a pose of the drone via techniques such as odometry and SLAM localization. The monitoring server 130 can determine a location of the sensor 104 within the drone's video frame. Based on known parameters of the drone's attached camera, the monitoring server 130 can project each feature of the sensor 104 to the 3D map 140. For example, the monitoring server 130 can map the sensor's position, six degree-of-freedom pose, and field of view 108 to the 3D surfaces of the 3D map 140.

In stage (F) of FIG. 1, the monitoring server 130 determines drone missions 132 based on the 3D map 140. Specifically, the monitoring server 130 can plan drone paths based on mapped sensor 104 fields of view 108. For example, the monitoring server 130 can plan drone missions 132 to conduct surveillance in areas of the property 102 that are not within a field of view 108 of a sensor 104. In some examples, the monitoring server 130 can plan drone missions 132 to maneuver within fields of view 108 of sensors 104 in order to improve localization of the drone 110 while maneuvering.

In some examples, the monitoring server 130 can determine to adjust sensors based on the 3D map 140. For example, the monitoring server 130 can determine updated positions of one or more sensors in order to reduce sensor blind spots and to improve coverage.

In some examples, the monitoring server 130 may be able to move the sensor 104. For example, the monitoring server 130 can send a command to the sensor 104 to rotate to a new or updated position that was determined based on the 3D map. In some examples, the monitoring server 130 can move the sensor 104 in real time, e.g., while the drone 110 is in or near the detection area of the sensor 104. The drone 110 can then determine an updated detection area of the sensor 104 after the sensor 104 has moved to the updated position.

Though described above as being performed by a particular component of system 100 (e.g., the control unit 106 or the monitoring server 130), any of the various control, processing, and analysis operations can be performed by either the control unit 106, the monitoring server 130, the drone 110, the sensor 104, or another computer system of the system 100. For example, the control unit 106, the monitoring server 130, the drone 110, the sensor 104, or another computer system can analyze the image data 126. Similarly, the control unit 106, the monitoring server 130, the drone 110, or another computer system can control the various sensors 104 to collect data or control device operation. The control unit 106, the monitoring server 130, the sensor 104, or another computer system can control the drones 110 to collect data or control device operation. Additionally, the 3D map 140 may be stored and updated on the monitoring server 130, the control unit 106, the drone 110, and/or the sensor 104.

The concepts presented above extend to sensor technologies beyond video cameras. Passive Infrared (PIR), active IR, RADAR, sonar, time of flight (ToF), structured light, and LIDAR sensing all share similar attributes and benefits as described with reference to FIG. 1. In addition, refinement of specific sensor performance can be tuned based on positional feedback from a drone relative to a sensor.

PIR sensors detect motion of objects based on measuring infrared light radiating from objects in a field of view. A drone can map the areas of sensitivity of a PIR sensor by flying through the presumed field of view and accurately measuring the true area of coverage. In addition, a drone could operate in a user designated area for pet immunity and confirm successful PIR immunity. By operating low to the ground, the drone can simulate pets and confirm no PIR detection. The drone can then raise in altitude to simulate a human presence, thereby confirming operation of the sensor.

Sonar sensors primarily provide proximity information when an object is detected within range of a certain field of view. The field of view inherently follows a lobe shape which can vary in range and depth based on one or more of operating voltage, manufacturing differences, or installation reflections. With relative positional information from the drone and sonar sensor, the unique pattern of the sonar can be determined in the actual installation location.

In cases of poor performance such as insufficient range, information regarding the unique pattern of the sonar can be fed back from the drone to the sonar sensing element to adjust the sonar sensing element. For example, an adjustment can include increasing the operating voltage, therefore increasing the range and sensitivity of the sonar sensor. The adjustment may be performed by the sonar sensing element, or by a computing system such as a control unit or monitoring server that is configured to control the sonar sensor.

In some examples, the drone can send feedback, and the sonar sensor can make adjustments based on the feedback, in real time. For example, the drone can send feedback to a control unit while the drone is within or near the detection area of the sonar sensor. The control unit can send a command to the sonar sensor to adjust one or more parameters, e.g., to increase signal power. The sonar sensor signal can then adjust the one or more parameters. The drone can detect a new detection area of the sensor after the adjustment is made. Thus, the drone can be used to update sensor parameters in real time in order to improve sensor detection.

The drone can accurately map individual sensor performance, e.g., range and azimuth. The drone can also determine susceptibility to multipath by flying in the field of view and coordinating sensor feedback information with drone relative positional information. This would allow for confirmation of operation or areas of low or high sensitivity.

Figure 2:
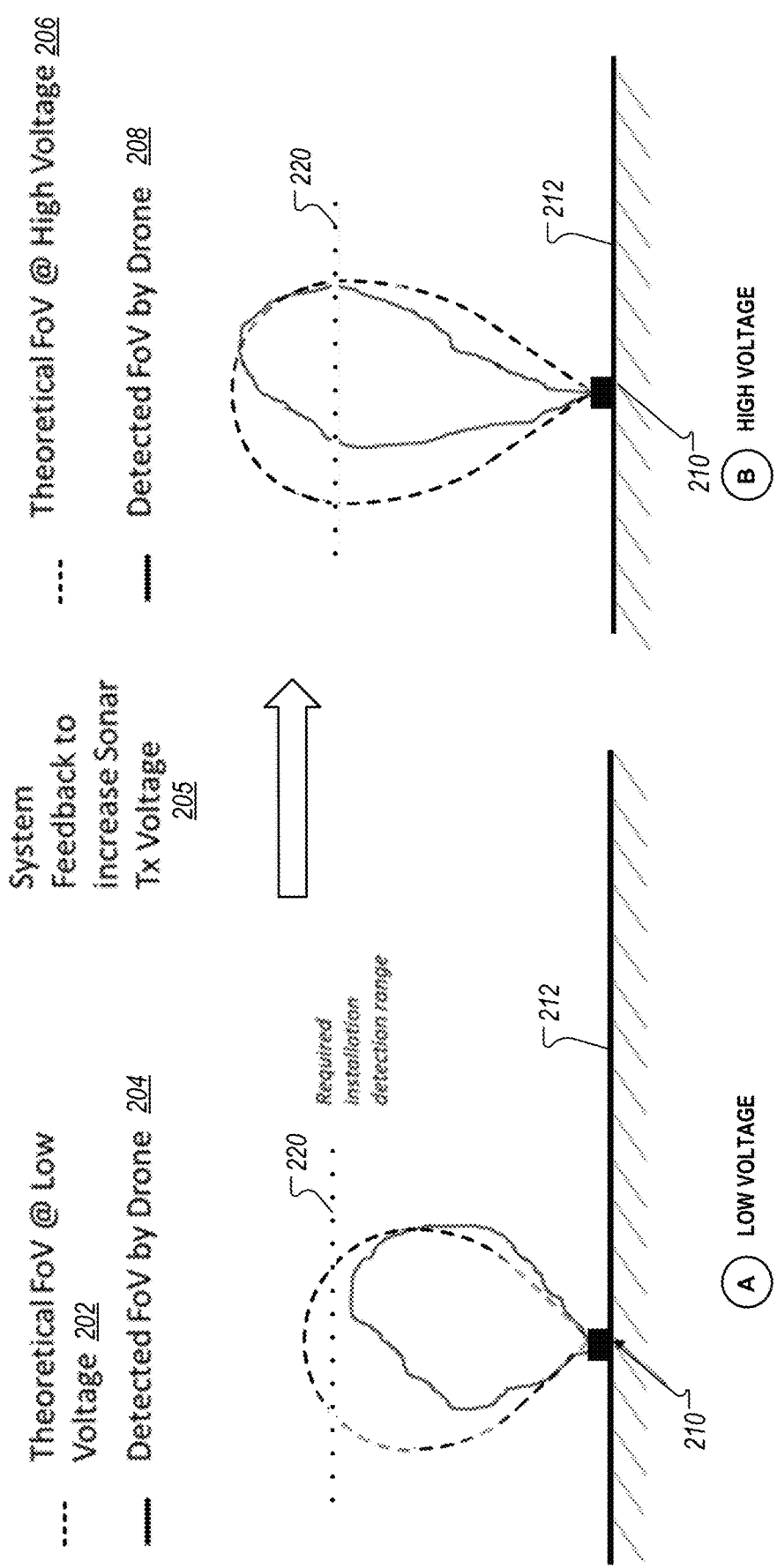
FIG. 2 is a diagram of an example process for refining sensor performance using a drone.

FIG. 2 is a diagram of an example process for refining sensor performance using a drone. Specifically, FIG. 2 illustrates an overhead view of a sonar sensor 210. The sonar sensor 210 may be mounted on a structure such as a wall 212. The sonar sensor 210 may have a required installation detection range 220. Though FIG. 2 illustrates a process for refining sonar sensor performance, the process can be used for any type of sensor, e.g., a passive infrared sensor, an active infrared sensor, a radar sensor, a structured light sensor, a lidar sensor, a camera, etc.

In stage (A) of FIG. 2, the sonar sensor 210 is at a low voltage. At low voltage, the sonar sensor 210 has a theoretical field of view 202. The theoretical field of view 202 is lobe-shaped and extends past the required installation detection range 220.

A drone can enter the theoretical field of view 202 and measure the true area of coverage of the sonar sensor 210. The drone can detect a true field of view 204. The true field of view 204 has a range that is less than the required installation detection range 220. Therefore, the drone can provide system feedback 205 to increase the sonar transmitter (Tx) voltage.

In stage (B) of FIG. 2, in response to receiving system feedback 205, the sonar sensor 210 can increase to a high voltage. At high voltage, the sonar sensor 210 has a theoretical field of view 206. The theoretical field of view 202 extends past the required installation detection range 220.

A drone can enter the theoretical field of view 206 and measure the true area of coverage of the sonar sensor 210. The drone can detect a true field of view 208. The true field of view 208 has a range that is greater than the required installation detection range 220.

ToF sensors can determine ranges of objects within a field of view based on measuring a round trip time for light to travel to and from the objects. ToF sensors can allow for software adjustable regions of interest (ROI) on the receiving arrays thereby changing the field of view. An inherent tradeoff exists in this space with wider fields of view yielding shorter range capabilities, and narrower fields of view yielding longer range capabilities. An automated method to determine the necessary field of view can be to pre-map the space using the drone and determine the optimized field of view versus range for any given installation, especially since ToF sensors can be affected by light. ToF sensors facing windows or other significant light sources can be identified.

For example, a drone may map the area where a ToF sensor is located. The drone can map locations of walls, windows, mirrors, etc. Feedback from the drone can be used to adjust regions of interest of the sensor. For example, certain pixels of the ToF sensor's field of view may correspond to a window. Based on mapping the space with the drone, the ToF sensor can adjust the processing of the corresponding pixels to account for the presence of the window. Thus, mapping the location of the ToF sensor using the drone can improve detection accuracy of the ToF sensor.

Sonar, ToF, active IR, RADAR, structured light, and LIDAR sensors are active sensors. An active sensor transmits a signal or energy pulse that bounces off of an object to be sensed. The active sensor can determine characteristics of the object based on the reflected signal. For example, the active sensor can determine a range to the object and/or a speed and direction of object movement. The amount of energy reflected by the object can depend on the object's reflectivity, or the ratio between reflected energy and incident energy.

A drone can include a target of known reflectivity in order to provide a reference point for a given range and/or incidence angle to an active sensor. The target may be attached to the drone. An example target may be known to reflect 50% of incident energy back to the sensor at a certain close range and incidence angle to the sensor, and to reflect 40% of incident energy at a certain farther range to the sensor at a same or similar incidence angle. The sensor can be calibrated to the known reflectivity of the target. When the drone with the attached target enters the sensor's field of view, the sensor can determine the ratio of energy reflected by the drone in order to more accurately determine the drone's range and/or incidence angle to the sensor.

A drone that includes a target of known reflectivity can also be used to improve the sensor's ability to identify the drone. For example, the sensor may determine that the drone is positioned at a certain range from the sensor, based on measuring the time between transmitting an energy pulse and receiving the reflected energy pulse from the drone. The sensor can determine the ratio of energy reflected by the drone at the measured range. Based on knowing the reflectivity of the target attached to the drone, the sensor can then identify the drone.

For example, a first drone can include a target of known reflectivity that is known to reflect 50% energy at a range of three meters, 40% energy at a range of six meters, and 30% energy at a range of nine meters. A second drone can include a target of known reflectivity that is known to reflect 40% energy at a range of three meters, 30% energy at a range of six meters, and 20% energy at a range of nine meters. When an unknown drone enters a sensor's field of view, the sensor can measure the range and reflectivity of the unknown drone using an active energy pulse. The sensor may determine that the unknown drone is positioned at a range of six meters from the sensor, and that the unknown drone reflected 40% of the incident energy back to the sensor. Based on comparing the range and the ratio of reflected energy to the known target values, the sensor can then determine that the unknown drone within the field of view is the first drone, and not the second drone.

In some examples, a drone can include an electronic identifier tag, such as a radio-frequency identification (RFID) tag. An example RFID tag can be a near field communication (NFC) tag. The sensor can include an RFID sensor in order to detect and identify the drone based on reading the RFID tag on the drone.

A drone can include one or more receivers that can correspond to energy transmitted by the active sensors. For example, for use with a sonar sensor, the drone can include a sonar transducer. For use with a ToF sensor or active IR sensor, the drone can include an IR receiver. The IR receiver can include IR sensitive diodes and/or a spectrometer in order to discriminate between bands of the IR spectrum. The IR sensitive diodes can correspond to specific wavelengths transmitted by a specific sensor. In this way, the drone can identify individual sensors based on the particular energy wavelengths received by the IR receiver on the drone.

Adding receivers to the drone can allow an active sensor to transmit in a one-way direction to the drone. The system can determine a time difference and/or energy attenuation between transmission by the active sensor and reception by the drone's receiver. Based on the time difference and energy attenuation, the system can determine a distance and/or incidence angle between the active sensor and the drone.

Using one-way transmission can reduce the effects of environmental factors on the transmitted energy, e.g., due to attenuation, absorption, and scattering. Adding one or more receivers to the drone can also reduce the effects of the drone's reflectivity on the active sensor measurements. This can enable the active sensor to detect drones of any appropriate shape, whether or not the drone includes reflective surfaces.

In some examples, the drone can include one or more active transmitters, and the sensor can include one or more receivers corresponding to energy transmitted by the drone. Techniques for identifying individual sensors, and for measuring ranges, speeds, and incidence angles, can be similar to techniques described above, with the drone transmitting the energy and the sensor receiving and/or reflecting the energy.

Figure 3:
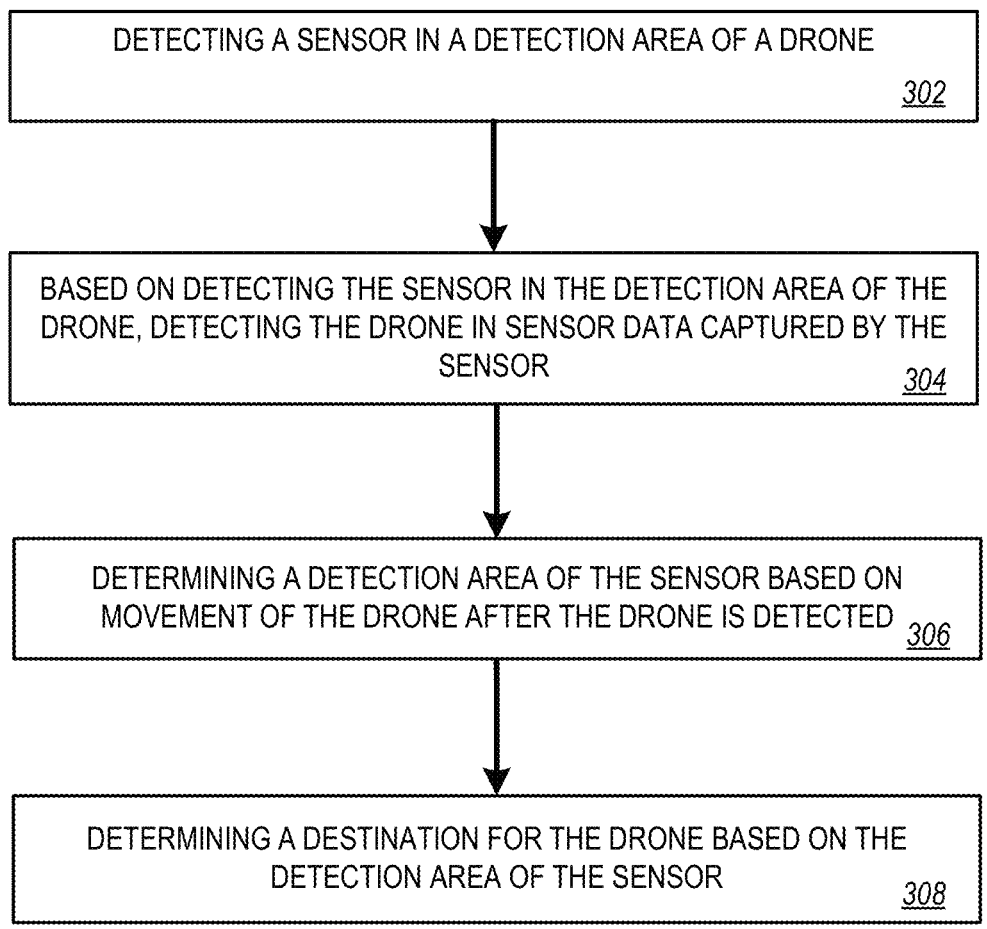
FIG. 3 is a flow chart of an example process for drone assisted sensor mapping.

FIG. 3 is a flow chart of an example process 300 for drone assisted sensor mapping. The process can be performed by one or more computing systems. For example, the process 300 can be performed by the control unit 106, the monitoring server 130, the drone 110, the sensor 104, or another computing system of the system 100. In some examples, some steps of the process 300 can be performed by a first computing system, e.g., the control unit, and other steps of the process 300 can be performed by a second computing system, e.g., the monitoring server 130.

The process 300 includes detecting a sensor in a detection area of a drone (302). The sensor may be a fixed sensor. For example, the sensor may be installed at a location in the property, e.g. mounted to a wall of the property. The sensor has a location, e.g., a coordinate location with respect to an overhead view of the property. The sensor has an elevation, e.g., a height above ground or floor level of the property. The sensor may have an orientation, e.g., a six degree of freedom orientation. In some examples, the sensor may have pan-tilt-zoom (PTZ) capabilities.

In some examples, the sensor is a camera. For example, the sensor 104 can be the video camera of the system 100. In some examples, the sensor is a passive infrared sensor, an active infrared sensor, a radar sensor, a sonar sensor, a time of flight sensor, a structured light sensor, or a lidar sensor.

The drone can be, for example, the aerial drone of the system 100. The drone can include one or more sensors attached to the drone. For example, the drone can include a camera, a microphone, a radar sensor, a lidar sensor, etc. In some examples, detecting the sensor in the detection area of the drone includes detecting the sensor in an image captured by a camera of the drone. For example, the drone may have an attached visible image camera. The camera can capture still images or video images that include a depiction of the sensor.

The process 300 includes, based on detecting the sensor in the detection area of the drone, detecting the drone in sensor data captured by the sensor (304). For example, when the drone enters the detection area of the sensor, the sensor can detect the drone. The sensor may be able to recognize or identify the drone based on one or more characteristics of the drone. When the drone exits the detection area of the sensor, the sensor can no longer detect the drone.

In some examples, detecting the drone in the sensor data captured by the sensor includes detecting the drone in an image captured by the camera. For example, the sensor 104 may be a camera that captured video images of an area of a property, e.g., the property 102. The sensor may capture images that include a depiction of the drone.

In some examples, detecting the drone in the sensor data captured by the sensor includes detecting movement in the detection area of the sensor. For example, the system may be configured to assume that there are no other moving objects within the detection area of the sensor. When the sensor 104 detects a moving object, the system can then determine that the moving object is the drone.

In some examples, detecting the drone in the sensor data captured by the sensor includes detecting energy that was transmitted from the drone and received by the sensor. For example, the drone may include a transmitter, e.g., a radar, sonar, or lidar transmitter. The sensor can detect the drone based on receiving energy transmitted from the drone. In some examples, the sensor can determine a location of the drone based on characteristics of the drone. For example, the sensor may determine a vector position of the drone based on an angle of incidence of the energy transmitted from the drone. In some examples, the sensor may determine a range to the drone based on a strength or amplitude of energy received from the drone. In some examples, the drone can transmit energy with a particular pattern. For example, the drone can flash lights in a pattern that is associated with the drone. The process 300 can include detecting the drone by detecting the pattern of flashing lights.

In some examples, detecting the drone in the sensor data captured by the sensor includes detecting energy that was transmitted by the sensor and reflected from the drone. For example, the sensor may be an active sensor, e.g., a radar, sonar, or lidar sensor. The sensor can emit a pulse of energy that reflects off of the drone and returns to the sensor. The sensor can detect, identify, and/or locate the drone based on characteristics of the received energy.

Detecting the drone in the sensor data captured by the sensor can include detecting an electromagnetic signature or an acoustic signature of the drone in the sensor data. For example, the sensor may emit electromagnetic or acoustic energy. When the drone is within the detection area of the sensor, the energy reflects off of the drone and returns to the sensor. The signature of the drone can be used for recognition, detection, and identification of the drone. The signature of the drone can include a strength of the return signal received from the drone, which can be affected by the size, shape, and orientation of the drone. For example, a larger drone will likely return a stronger signal than a smaller drone.

In some examples, detecting the drone in the sensor data captured by the sensor includes detecting movement of the drone in a recognized pattern. For example, the drone may maneuver in a pattern, e.g., a vertical oscillation pattern, a lateral oscillation pattern, a figure eight pattern, etc. The system can be programmed to recognize the drone based on the pattern of movement of the drone. The system may also be programmed to recognize the drone based on characteristics of movement of the drone. For example, the drone may operate at a particular speed or range of speeds, at a particular elevation or range of elevations, etc. The system may be able to detect and identify the drone based on detecting movement having characteristics associated with drone movement.

The process 300 includes determining a detection area of the sensor based on movement of the drone after the drone is detected (306). The detection area of the sensor can include a three-dimensional shape representing a volume of space where objects can be detected by the sensor. The detection area can include boundaries forming, for example, a conical, spherical, pyramid, or lobe shape. The detection area can include a range, or distance, of detection at various angles from the sensor. For example, an overall maximum range may be directly in front of the sensor, e.g., at a zero degree angle. The range may decrease at increasing angles away from centerline of the sensor.

The process includes receiving, from the drone, timestamped data indicating at least one pose of the drone. For example, the drone may provide data indicating that at time 8:04:15 am, the drone is positioned at a first pose including a first location and elevation. The drone may also provide data indicating that at time 8:04:25 am, the drone is positioned at a second pose including a second location and elevation. The data indicating the poses can also include, for each pose, an orientation, a range to the sensor, a vector angle to the sensor, etc.

The process includes receiving, from the sensor, timestamped data indicating, for each of the at least one pose of the drone, a respective location of the drone within the detection area of the sensor. The location of the drone within the detection area of the sensor can be represented, for example, for example, by a two dimensional or three dimensional coordinate. For example, for a sensor that is a camera, the location of the drone within the detection area can be represented by an x-y pixel coordinate of an image captured by the camera. The timestamped data may indicate that at time 8:04:15 am, the drone is located at a pixel coordinate $[x_1,y_1]$ in an image captured by the sensor. The timestamped data may indicate that at time 8:04:25, the drone is located at a pixel coordinate $[x_2,y_2]$.

Based on the timestamped data indicating the at least one pose of the drone, and the timestamped data indicating the respective locations of the drone within the detection area of the sensor, the system determines the detection area of the sensor. For example, the system can map the pixel coordinate $[x_1,y_1]$ to the first pose of the drone, and can map the pixel coordinate $[x_2,y_2]$ to the second pose of the drone. The system can determine that the first pose and the second pose are within the detection area of the sensor.

In some examples, determining the detection area of the sensor includes determining boundaries of the detection area of the sensor. To determine boundaries of the detection area, the system can receive, from the drone, timestamped data indicating time-varying poses of the drone. The time-varying poses of the drone can include a pose of the drone at time intervals of, e.g., one-half second, one second, or two seconds. For example, the time-varying poses can include a first pose at time 10:15:03, a second pose at 10:15:04, and a third pose at 10:15:05.

In some examples, the system can receive, from the drone, timestamped data indicating time-varying poses of the drone during a time period when the drone is within the detection area of the sensor. The system can map the timestamped data indicating the time-varying poses of the drone to a location of the detection area of the sensor. For example, the first pose may map to a three-dimensional coordinate of a three-dimensional detection area of the sensor.

The system can determine, based on the sensor data, a time that the drone entered or exited the detection area of the sensor. For example, the sensor data may indicate that at time 10:15:03, the sensor did not detect the drone, and that at time 10:15:04, the sensor did detect the drone. Thus, the system can determine that the drone entered the detection area of the sensor at time 10:15:04. The drone may enter the detection area, e.g., by approaching within a detection range of the sensor. The drone may then exit the detection area by moving away from the sensor past the detection range. The drone may also enter the detection area by entering within an angular field of view of the sensor. The drone can enter the field of view, e.g., from a direction above, below or to the side of the field of view. The drone may exit the detection area by exiting the angular field of view of the sensor.

The system can determine, based on (i) the timestamped data indicating the time-varying poses of the drone and (ii) the time that the drone entered or exited the detection area of the sensor, a boundary of the detection area of the sensor. For example, based on the second pose at 10:15:04, and the time that the drone entered the detection area at the sensor at 10:15:04, the system can determine that the second pose is located at a boundary of the detection area of the sensor. The boundary of the detection area may be, for example, a vector, a plane, or a curved plane extending from the sensor. The boundary of the detection area may also be a vector, a plane, or a curved plane defining the range of the sensor.

In some examples, determining the detection area of the sensor includes determining at least one of a pose of the sensor, a two-dimensional field of view of the sensor, a three-dimensional field of view of the sensor, or a range of the sensor. The pose of the sensor can be, for example, a location, an elevation, and a six degree of freedom orientation of the sensor. A two-dimensional field of view of the sensor can be a two-dimensional angle between lateral, vertical, or diagonal boundaries of the sensor. A three-dimensional field of view of the sensor can be a solid angle between boundaries of the sensor. A range of the sensor can be a maximum detection distance of the sensor.

The system can repeat the process of determining boundaries of the detection area. For example, the drone can repeatedly enter and exit the detection area from multiple different angles and distances. The system can maneuver the drone while receiving timestamped data indicating the time-varying poses of the drone. The system can maneuver the drone to exit the detection area, and can determine, based on the sensor data, that the drone exited the detection area of the sensor. In response to determining that the drone exited the detection area of the sensor, the system can maneuver the drone into the detection area. The system can determine, based on the sensor data, that the drone entered the detection area of the sensor. In response to determining that the drone entered the detection area of the sensor, the system can again maneuver the drone. The system can repeatedly maneuver the drone into and out of the detection area. Based on the timestamped data indicating the time-varying poses of the drone, the system can identify one or more boundaries of the detection area of the sensor.

Based on timestamped data indicating the poses and the times that the drone entered and exited the detection area, the system can identify multiple boundaries of the detection area. The boundaries can include, for example, lateral boundaries, e.g., a left boundary and a right boundary. The boundaries can also include vertical boundaries, e.g., an upper boundary and a lower boundary. The boundaries can also include a range boundary. The boundaries may define a three-dimensional shape. For example, the boundaries may form a three-dimensional lobe shape, with a maximum detection range being located at a center of the lobe, and the detection range decreasing at angles away from the center.

In some examples, the process includes mapping boundaries of the detection area of the sensor to a map of an area where the sensor is located. For example, the system can store a map of an area where the sensor is installed, e.g., a room of a property. In some examples, the map can be a three-dimensional map. The system can map the boundaries of the detection area of the sensor to the map of the area, e.g., by overlaying the shape of the detection area on the map.

The process 300 includes determining a destination for the drone based on the detection area of the sensor (308). The destination for the drone can include a blind spot of the sensor. A blind spot can be a location that is not within the detection area of the sensor. The system can determine a destination for the drone that is a blind spot, e.g., in order to detect or track objects that are not located within the detection area of the sensor.

In some examples, the process 300 includes deploying the drone to the destination. For example, the system can transmit an instruction to the drone that causes the drone to move to the destination. The system can deploy the drone to the destination, e.g., to a blind spot, in order to collect sensor data that is not detected by other sensors installed at the property. For example, the drone may determine that a blind spot of a sensor exists near an entrance to the property. In response to determining that the blind spot of the sensor exists near the entrance, the system can deploy the drone to the blind spot in order to detect activity near the entrance. Thus, the drone can detect activity that might not be detected by fixed sensors installed at the property.

In some examples, the process 300 includes detecting a person in sensor data captured by the sensor, and the destination for the drone includes a predicted location of the person after the person exits the detection area of the sensor. For example, a person may walk through an area, e.g., a room, where the sensor is located. The person may enter the detection area of the sensor and then exit the detection area of the sensor. The system can predict, based on movement of the person, a location of the person after the person exits the detection area. The system can determine a destination for the drone that includes the predicted location of the person. The drone can then collect data representing locations and movements of the person.

In some examples, the process 300 includes adjusting the sensor based on determining the detection area of the sensor. For example, the system may determine that the detection area of the sensor does not have sufficient range for the installation location of the sensor. The system can determine to adjust the sensor based on determining that the detection area of the sensor does not have sufficient range. For example, the system can adjust the sensor by increasing a power level of the sensor. In another example, the system may determine that the detection area does not include a region of interest, e.g., a doorway of a property. The system can determine to adjust the sensor to a position such that the region of interest is included in the detection area of the sensor. For example, the system can adjust the sensor by rotating the sensor in the direction of the region of interest.

Figure 4:
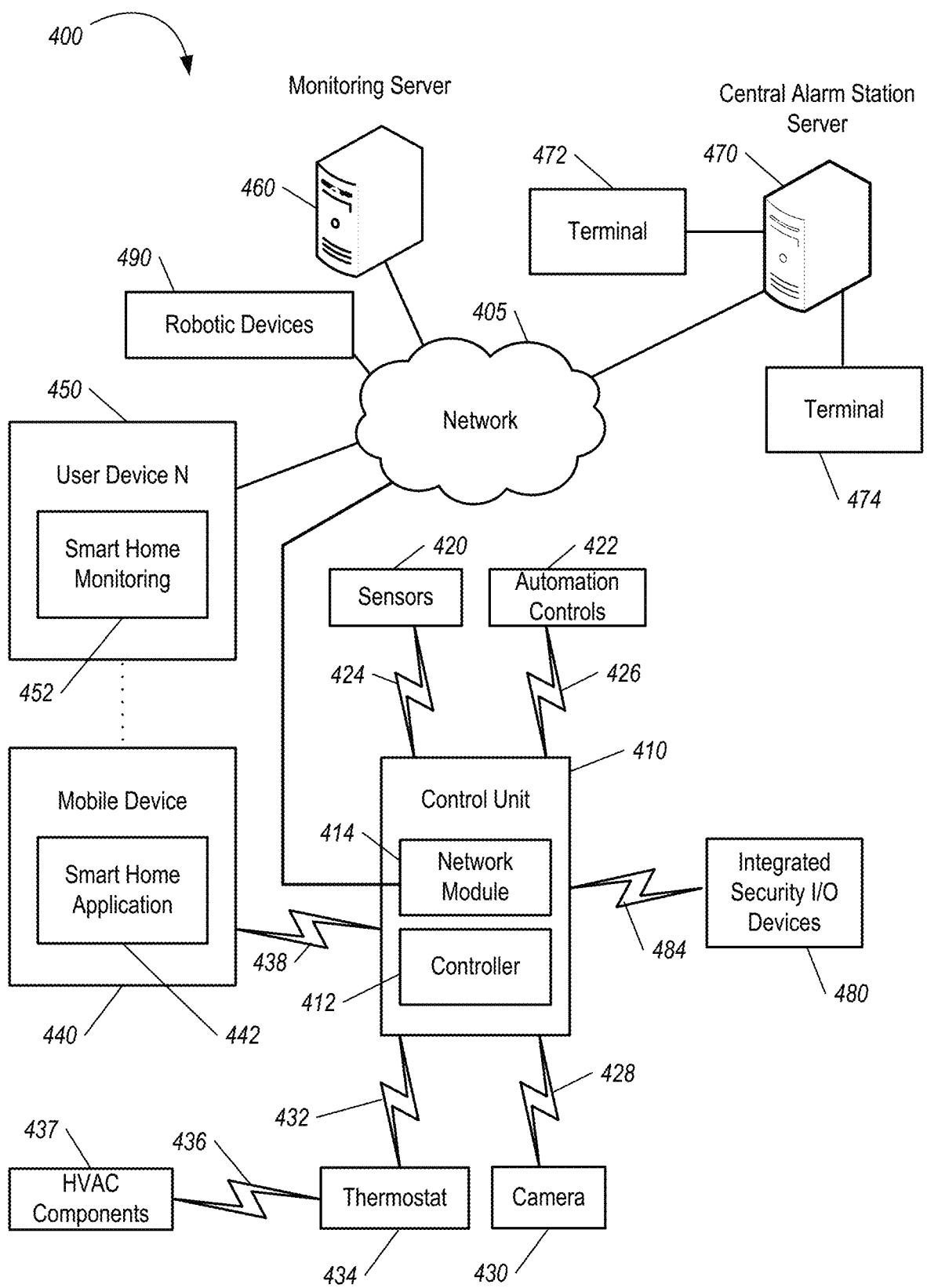
FIG. 4 is a diagram illustrating an example of a property monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floor plan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media.

The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
 detecting, for deployment of a drone to a blind spot of an installed sensor at a building to increase sensor coverage of the building and using time-varying poses pests of the drone and time-varying locations of the drone to which the time-varying poses are mapped to discover boundaries of a detection area for the installed sensor using the time-varying poses to which none of the time-varying locations were mapped and to determine the blind spot using the boundaries of the detection area, the drone in sensor data captured by the installed sensor at a fixed location of the building,
  wherein the drone includes a second sensor that is a different sensor than the installed sensor at the fixed location of the building;
 discovering the boundaries of the detection area of the installed sensor relative to the location of the installed sensor using data that indicates movement of the drone after the drone is detected,
  the discovering comprising:
   receiving, from the drone, first timestamped pose data indicating the time-varying poses of the drone during a time period after the drone is detected by the installed sensor;
   receiving, from the installed sensor, second timestamped data indicating the time-varying locations of the drone within the detection area of the installed sensor during the time period after the drone is detected by the installed sensor,
    wherein the first timestamped pose data is a different type of data from the second timestamped data;
   mapping, using the first timestamped pose data from the drone and the second timestamped data from the installed sensor, a) the time-varying poses of the drone during the time period after the drone is detected by the installed sensor indicated by the first timestamped pose data received from the drone to b) the time-varying locations of the drone within the detection area of the installed sensor during the time period after the drone is detected by the installed sensor indicated by the second timestamped data received from the installed sensor;
   detecting, in the time-varying poses of the drone during the time period after the drone is detected by the installed sensor, one or more first time-varying poses of the drone to which none of to the time-varying locations of the drone within the detection area of the installed sensor were mapped in the mapping of a) the time-varying poses of the drone during the time period after the drone is detected by the installed sensor to b) the time-varying locations of the drone within the detection area of the installed sensor during the time period after the drone is detected by the installed sensor; and discovering the boundaries of the detection area of the installed sensor relative to the location of the installed sensor using the one or more first time-varying poses of the drone to which none of the time-varying locations of the drone within the detection area of the installed sensor were mapped;

determining, using the boundaries of the detection area of the installed sensor discovered using the one or more first time-varying poses of the drone to which none of the time-varying locations of the drone within the detection area of the installed sensor were mapped, the blind spot of the installed sensor; and determining to increase sensor coverage of the building using the second sensor of the drone by deploying the drone to a destination within the blind spot of the installed sensor.

2. The method of claim 1, wherein discovering the boundaries of the detection area of the installed sensor using data that indicates movement of the drone after the drone is detected comprises:

determining, based on the sensor data, a time that the drone entered or exited the detection area of the installed sensor; and determining, based on (i) the first timestamped pose data indicating the time-varying poses of the drone and (ii) the time that the drone entered or exited the detection area of the installed sensor, boundaries of the detection area of the installed sensor.

3. The method of claim 1, wherein discovering the boundaries of the detection area of the installed sensor using data that indicates movement of the drone after the drone is detected comprises:

receiving, from the drone, the first timestamped pose data indicating the time-varying poses of the drone while repeatedly:

determining, based on the sensor data, that the drone exited the detection area of the installed sensor;

in response to determining that the drone exited the detection area of the installed sensor, maneuvering the drone;

in response to maneuvering the drone, determining, based on the sensor data, that the drone entered the detection area of the installed sensor; and in response to determining that the drone entered the detection area of the installed sensor, maneuvering the drone; and based on the first timestamped pose data indicating the time-varying poses of the drone that includes data indicating that the drone exited the detection area of the installed sensor and data indicating that the drone entered the detection area of the installed sensor, identifying the boundaries of the detection area of the installed sensor.

4. The method of claim 1, comprising adjusting the installed sensor based on discovering the boundaries of the detection area of the installed sensor.

5. The method of claim 1, wherein the installed sensor is an installed camera, and detecting the drone in the sensor data comprises detecting the drone in an image captured by the installed camera.

6. The method of claim 1, wherein detecting the drone in sensor data captured by the installed sensor comprises detecting movement in the detection area of the installed sensor.

7. The method of claim 1, wherein detecting the drone in sensor data captured by the installed sensor comprises detecting an electromagnetic signature or an acoustic signature of the drone in the sensor data.

8. The method of claim 1, wherein detecting the drone in sensor data captured by the installed sensor comprises detecting energy that was transmitted from the drone and received by the installed sensor.

9. The method of claim 1, wherein detecting the drone in sensor data captured by the installed sensor comprises detecting energy that was transmitted by the installed sensor and reflected from the drone.

10. The method of claim 1, wherein detecting the drone in sensor data captured by the installed sensor comprises detecting movement of the drone in a recognized pattern.

11. The method of claim 1, comprising determining the destination for the drone by:

detecting a person in sensor data captured by the installed sensor; and determining a predicted location of the person after the person exits the detection area of the installed sensor, wherein the destination for the drone comprises the predicted location of the person after the person exits the detection area of the installed sensor.

12. The method of claim 1, comprising mapping the boundaries of the detection area of the installed sensor to a map of an area including the location where the installed sensor is installed.

13. The method of claim 1, wherein the installed sensor comprises a passive infrared sensor, an active infrared sensor, a radar sensor, a sonar sensor, a time of flight sensor, a structured light sensor, or a lidar sensor.

14. A system comprising one or more computers and one or more computer storage media storing instructions that are operable, when executed by the one or more computers, to cause the one or more computers to perform operations comprising:

detecting, for deployment of a drone to a blind spot of an installed sensor at a building to increase sensor coverage of the building and using time-varying poses of the drone and time-varying locations of the drone to which the time-varying poses are mapped to discover boundaries of a detection area for the installed sensor using the time-varying poses to which none of the time-varying locations were mapped and to determine the blind spot using the boundaries of the detection area, the drone in sensor data captured by the installed sensor at a fixed location of the building, wherein the drone includes a second sensor that is a different sensor than the installed sensor at the fixed location of the building;

discovering the boundaries of the detection area of the installed sensor relative to the location of the installed sensor using data that indicates movement of the drone after the drone is detected, the discovering comprising:

receiving, from the drone, first timestamped pose data indicating the time-varying poses of the drone during a time period after the drone is detected by the installed sensor;

receiving, from the installed sensor, second timestamped data indicating time-varying locations of the drone within the detection area of the installed sensor during the time period after the drone is detected by the installed sensor, wherein the first timestamped pose data is a different type of data from the second timestamped data;

mapping, using the first timestamped pose data from the drone and the second timestamped data from the installed sensor, a) the time-varying poses of the drone during the time period after the drone is detected by the installed sensor indicated by the first timestamped pose data received from the drone to b) the time-varying locations of the drone within the detection area of the installed sensor during the time period after the drone is detected by the installed sensor indicated by the second timestamped data received from the installed sensor;

detecting, in the time-varying poses of the drone during the time period after the drone is detected by the installed sensor, one or more first time-varying poses of the drone to which none of mapped to the time-varying locations of the drone within the detection area of the installed sensor were mapped in the mapping of a) the time-varying poses of the drone during the time period after the drone is detected by the installed sensor to b) the time-varying locations of the drone within the detection area of the installed sensor during the time period after the drone is detected by the installed sensor; and discovering the boundaries of the detection area of the installed sensor relative to the location of the installed sensor using the one or more first time-varying poses of the drone to which none of the time-varying locations of the drone within the detection area of the installed sensor were mapped;

determining, using the boundaries of the detection area of the installed sensor discovered using the one or more first time-varying poses of the drone to which none of the time-varying locations of the drone within the detection area of the installed sensor were mapped, the blind spot of the installed sensor; and determining to increase sensor coverage of the building using the second sensor of the drone by deploying the drone to a destination within the blind spot of the installed sensor.

15. One or more non-transitory computer-readable media storing software comprising instructions executable by one or more computers which, upon such execution, cause the one or more computers to perform operations comprising:

detecting, for deployment of a drone to a blind spot of an installed sensor at a building to increase sensor coverage of the building and using time-varying posts of the drone and time-varying locations of the drone to which the time-varying poses are mapped to discover boundaries of a detection area for the installed sensor using the time-varying poses to which none of the time-varying locations were mapped and to determine the blind spot using the boundaries of the detection area, the drone in sensor data captured by the installed sensor at a fixed location of the building, wherein the drone includes a second sensor; that is a different sensor than the installed sensor at the fixed location of the building discovering the boundaries of the detection area of the installed sensor relative to the location of the installed sensor using data that indicates movement of the drone after the drone is detected by the installed sensor, the discovering comprising:

receiving, from the drone, first timestamped pose data indicating the time-varying poses of the drone during a time period after the drone is detected;

receiving, from the installed sensor, second time-stamped data indicating time-varying locations of the drone within the detection area of the installed sensor during the time period after the drone is detected by the installed sensor, wherein the first timestamped pose data is a different type of data from the second timestamped data;

mapping, using the first timestamped pose data from the drone and the second timestamped data from the installed sensor, a) the time-varying poses of the drone during the time period after the drone is detected by the installed sensor indicated by the first timestamped pose data received from the drone to b) the time-varying locations of the drone within the detection area of the installed sensor during the time period after the drone is detected by the installed sensor indicated by the second timestamped data received from the installed sensor;

detecting, in the time-varying poses of the drone during the time period after the drone is detected by the installed sensor, one or more first time-varying poses of the drone to which none of mapped to the time-varying locations of the drone within the detection area of the installed sensor were mapped in the mapping of a) the time-varying poses of the drone during the time period after the drone is detected by the installed sensor to b) the time-varying locations of the drone within the detection area of the installed sensor during the time period after the drone is detected by the installed sensor; and discovering the boundaries of the detection area of the installed sensor relative to the location of the installed sensor using the one or more first time-varying poses of the drone to which none of the time-varying locations of the drone within the detection area of the installed sensor were mapped;

determining, using the boundaries of the detection area of the installed sensor discovered using the one or more first time-varying poses of the drone to which none of the time-varying locations of the drone within the detection area of the installed sensor were mapped, the blind spot of the installed sensor; and determining to increase sensor coverage of the building using the second sensor of the drone by deploying the drone to a destination within the blind spot of the installed sensor.

16. The method of claim 1, wherein each of the time-varying locations of the drone within the detection area of the installed sensor comprises a pixel coordinate location within the detection area of the installed sensor.

17. The method of claim 1, wherein:
the installed sensor comprises an image sensor;
the second sensor is a different type of sensor than the installed sensor; and
each of the time-varying poses of the drone comprises at least one of: an elevation of the drone, an orientation of the drone, a distance of the drone from the installed sensor, or a vector angle from the drone to the installed sensor.

18. The method of claim 1, wherein the second sensor of the drone comprises a camera, the method comprising:
- detecting, in an image captured by the camera of the drone, a depiction of the installed sensor;
- determining, based on the depiction of the installed sensor in the image captured by the camera of the drone, an estimated detection area of the installed sensor;
- maneuvering the drone within the estimated detection area of the installed sensor; and
- discovering the boundaries of the detection area of the installed sensor based on movement of the drone as the drone maneuvers within the estimated detection area of the installed sensor.

19. The method of claim 1, wherein the first timestamped pose data indicating time-varying poses of the drone comprises a set of images captured by the second sensor of the drone, the set of images including:
- a first image captured by the second sensor while the drone has a first pose at a first time; and
- a second image captured by the second sensor while the drone has a second pose at a second time.

20. The method of claim 19, wherein the second timestamped data indicating time-varying locations of the drone within the detection area of the installed sensor comprises:
- a first pixel coordinate location of the drone within the detection area of the installed sensor at the first time; and
- a second pixel coordinate location of the drone within the detection area of the installed sensor at the second time.

* * * * *

UNITED STATES PATENT AND TRADEMARK OFFICE
CERTIFICATE OF CORRECTION

| | |
|---|---|
| PATENT NO. | : 11,729,372 B2 |
| APPLICATION NO. | : 17/077017 |
| DATED | : August 15, 2023 |
| INVENTOR(S) | : Ahmad Seyfi et al. |

It is certified that error appears in the above-identified patent and that said Letters Patent is hereby corrected as shown below:

In the Claims

In Claim 1, Column 28, Line 14, after "poses" delete "pests".

In Claim 1, Column 28, Line 58, after "none of" delete "to".

In Claim 14, Column 31, Line 18 (approx.), before "the time-varying" delete "mapped to".

In Claim 15, Column 32, Line 29, before "the time-varying" delete "mapped to".

Signed and Sealed this
Third Day of October, 2023

Katherine Kelly Vidal
*Director of the United States Patent and Trademark Office*